Patented July 9, 1946

UNITED STATES PATENT OFFICE 2,403,464

HYDROLYZED VINYL ESTER INTERPOLYMER FIBERS

Albert Faris Smith, Wilmington, Del., assignor to E. I. du Pont de Nemours & Company, Wilmington, Del., a corporation of Delaware No Drawing. Application July 22, 1942, Serial No. 451,891

17 Claims. (Cl. 8—115.5)

This invention relates to novel artificial fibers, and to methods for preparing the same. More particularly it relates to novel oriented fibers of hydrolyzed interpolymers of vinyl organic ester with another polymerizable substance, and to methods involved in the manufacture of said fibers.

Interest in the commercial possibilities of water-sensitive hydrolyzed interpolymers of vinyl organic ester with another polymerizable substance, as a fiber-forming material has lagged because of the adverse results encountered in connection with the related polyvinyl alcohol resins. Thus, it is known that polyvinyl alcohol is a filament-forming material and that such filaments may be oriented to give strong flexible fibers. However, these fibers are not of general utility as they dissolve in water, and in every instance attempts to make these oriented fibers insensitive to water by after-treatments have failed to give satisfactory results.

An object of this invention, therefore, is to provide water-insensitive, oriented fibers of hydrolyzed interpolymers of vinyl organic ester with another polymerizable material.

A further object is to render oriented fibers of hydrolyzed interpolymers of vinyl organic ester with another polymerizable substance insensitive to water by a suitable after-treatment of said fibers.

A still further object is to provide oriented fibers of hydrolyzed interpolymers of vinyl organic ester with another polymerizable substance, which fibers are characterized by relatively high sticking points, by relatively low degrees of retraction in boiling water, and by substantial insolubility in boiling water.

Still another object is to after-treat oriented fibers of hydrolyzed interpolymers of a vinyl organic ester with another polymerizable substance whereby to increase the sticking points of said fibers, to decrease the retraction of the same in boiling water, and to render said fibers substantially insoluble in boiling water.

These and other objects will more clearly appear hereinafter.

I have found that if oriented fibers made from hydroxylated vinyl interpolymers in which less than 45% of the carbon atoms of the polymer chain are attached to groups from the class consisting of hydroxyl groups and organic radicals hydrolyzable to hydroxyl groups, are treated with polyfunctional substances, one mole each of which is reactive with a plurality of moles of diethylamine, there results fibers which do not disintegrate in water at 100° C. and have a substantially higher melting point and show substantially less retraction in hot water than the untreated fibers.

The interpolymers used in preparing the oriented fibers according to this invention are conveniently made by interpolymerizing a vinyl organic ester with one or more other polymerizable substances, such as ethylene, vinyl cyanide, vinyl chloride, vinylidene chloride, methyl vinyl ketone, methyl acrylate, and methyl methacrylate, esters of maleic and fumaric acid, and thereafter hydrolyzing the vinyl organic ester portion of the interpolymer to form the hydroxylated interpolymer.

The molar ratio of other polymerizable substance to vinyl organic ester in the interpolymer must be greater than 1:9 to satisfy the requirement that less than 45% of the carbon atoms in the polymer chain be attached to hydroxyl groups or organic groups hydrolyzable to hydroxyl groups. Organic groups hydrolyzable to hydroxyl groups are ester groups of formula

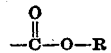

ether groups of formula —O—R, and acetal groups of formula (—O—R)$_2$, wherein R is a monovalent hydrocarbon radical.

The monomers from which the interpolymers are prepared can be emulsified in water and polymerized in the presence of catalysts, such as ammonium persulfate and benzoyl peroxide, generally at temperatures above 40° C. The preferred interpolymers with which this invention is particularly concerned are the interpolymers of ethylene with a vinyl organic ester, e. g. vinyl acetate. A charge consisting of vinyl acetate, water, dispersing agent and catalyst is placed in a pressure vessel, ethylene pressure is applied, and the mixture is agitated at 60°–75° C. After several hours, the interpolymer which has formed is taken out and unreacted vinyl acetate is removed by steam distillation. Details of the polymerization are given in U. S. application Serial No. 446,116, filed June 6, 1942.

The next step is hydrolysis of the interpolymer. Ethylene-vinyl acetate interpolymers, for example, are dissolved in alcohol or a toluene- or benzene-alcohol mixture, and then sodium hydroxide or potassium hydroxide in alcohol is added. After hydrolysis has been carried out to the desired degree, the resulting ethylene-vinyl alcohol interpolymer is isolated, e. g. by steam distilling to remove solvent, washing the residual polymer, and drying. In general, it is preferred to use a highly hydrolyzed product, i. e. a product wherein the hydrolysis is at least 95% and preferably 98 to 100% complete.

Filaments are prepared from the hydrolyzed interpolymer by melt or solution spinning methods. In melt spinning the hydrolyzed interpolymer is heated and pressure is applied to the molten or softened material to force it through the fine openings of a spinneret in the form of filaments. These filaments are cooled and mechanically wound on a bobbin which can be operated at various speeds. In solution spinning the polymer is dissolved in a suitable solvent to form a viscous solution. Suitable solvents are aqueous pyridine and other aqueous amines, aqueous chloroform-methanol mixtures, aqueous allyl alcohol, piperidine, morpholine, and phenol. The solution is forced through holes in a spinneret into a heated column where the solvent is flashed off, or into a liquid non-solvent for the interpolymer which coagulates the interpolymer in filament form.

After the spinning operation, the filaments are usually twisted together and the thread is drawn or stretched to produce molecular orientation along the longitudinal axis of the filament. The drawing is done by unwinding the twisted filaments from the bobbin, passing them through a liquid or gas held at a suitable temperature, usually higher than room temperature, and winding them on a second bobbin operating at a greater peripheral speed than the first bobbin. In this way, molecular orientation is produced in the fiber as revealed by X-ray diffraction patterns, and the tenacity of the fiber is much greater than that of the undrawn filament.

Polyfunctional substances, one mole of each of which will react with a plurality of moles of diethylamine, and which when applied to oriented fibers of the hydroxyl-containing interpolymers serve to substantially eliminate the water-sensitivity thereof, may be classified as follows:

(1) Methylol and alkoxymethyl derivatives of uron, i. e., the chemical compound having the structural formula

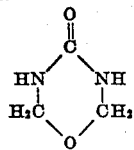

melamine, urea and diamides in general. Specific examples are dimethyloluron, trimethylolmelamine, dimethylolurea, N,N'-dimethylolsuccinamide, N,N'-dimethyloladipamide, etc., and the methyl ethers of these compounds.

(2) Polybasic acids and their acid halides. Specific examples are adipic acid, adipyl chloride, sebacic acid, sebacyl chloride, phosgene, boric acid, thionyl chloride, sulfuryl chloride, and chromic acid. Of these, the acid chlorides of polybasic acids are best.

(3) Polyhalogen compounds in which the halogen is attached to a carbon atom which in turn is attached to other atoms by single bonds only. This includes alpha, alpha'-dichlorethers, as alpha, alpha'-dichlorodimethylether and dichlorodioxane. Other examples are 1,4-dichloro-2-butene and omega, omega'-dichloroxylene.

(4) Compounds having a plurality of

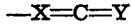

groups, where X is C or N; Y is O, S or NR. The most important examples are the diisocyanates.

(5) Certain conjugated unsaturates as quinone, acrolein, acrylonitrile.

(6) Aldehydes, particularly formaldehyde. Others are acrolein, glyoxal, acetaldehyde, and butyraldehyde.

(7) Chromic, ferric, and other heavy metal salts.

(8) Diquaternary ammonium compounds derived from alpha, alpha'-dichloroethers or bis-N-chloromethyldiamides. Examples are oxydimethylene bis-pyridinium chloride and adipyl bis-aminomethyl pyridinium chloride.

(9) Dithiols, e. g. ethanedithiol.

The general procedure for treating oriented fibers by the process of this invention consists in dissolving a substance of the above mentioned type, hereinafter referred to as the "after-treating agent," in a solvent which will not vitiate the action of the substance, and then soaking, spraying or otherwise treating the oriented fiber with this solution at a suitable temperature. Thereafter, the fiber can be rinsed, dipped in a catalyst solution if required, dried, and baked if necessary. In the case of some easily vaporizable after-treating agents, it is possible to treat the fibers with the reagent in the vapor phase, thus eliminating the use of solutions.

The exact details of the treatment of the oriented fiber with the after-treating agent will depend upon the physical and chemical characteristics of the particular agent used. For example, in the case of methoxymethyl derivatives of melamine, uron, urea and diamides, a 6% solution of the reagent in water is generally used. The fibers are soaked overnight in this solution containing a small amount of ammonium chloride as a catalyst and then air dried at elevated temperature, e. g. at about 85° C., and baked at about 135° C. Formaldehyde may be utilized in a similar procedure. Water-reactive agents, such as hexamethylene diisocyanate and adipyl chloride, are used in inert organic solvents. The fibers can be soaked in a 10% solution of hexamethylene diisocyanate in toluene for one hour at 70° C. Treatment of the fibers with adipyl chloride is carried out in the same manner except that a temperature of 25°–50° C. is sufficient. After this treatment the fibers are rinsed with toluene or other non-reactive solvent and the solvent is allowed to evaporate.

Some after-treating agents, e. g. those of class 4, are especially effective in raising the melting point of the fibers while others, e. g. those of class 1, are most effective in reducing retraction in water. For this reason it may be desirable to treat the fiber with more than one agent. A preferred treatment for the fibers is to use dimethylolurea first, followed by treatment with hexamethylene diisocyanate, thus giving the fibers the improvements of both reagents. The reverse order of treatment can be used with like effect.

This invention is further illustrated by the following specific examples, wherein parts are by weight unless otherwise indicated.

*Example I*

Oriented yarn prepared from hydrolyzed ethylene-vinyl acetate interpolymer having a mole ratio of 2.9/1, hydrolyzed 95% (12.1% of the carbon atoms of the polymer chain attached to hydroxyl and 0.6% attached to acetyl groups) is treated as follows: A skein of the yarn is submerged in a relaxed condition for ½ hour at 50° C. in a solution of 85 parts of toluene, 2 parts of pyridine, and 2 parts of adipyl chloride. After washing and drying, the treated yarn does not stick to a block until a temperature of 220° C. has been reached. It has a dry linear tenacity of 1.4 g./denier with 50% elongation and a loop tenacity of 1.1 g./denier. Untreated yarn shrinks 70% in water at 100° C., sticks to a block at 105° C., and has a dry linear tenacity of 2.4 g./denier with 11% elongation.

Example II (a) Oriented yarn prepared from hydrolyzed ethylenevinyl acetate having a mole ratio of 3/1, hydrolyzed 99% (12.4% of the carbon atoms in the polymer chain attached to hydroxyls and 0.1% attached to acetyl groups) is wound around a bobbin and treated at 102° C. for $\frac{1}{2}$ hour in a solution of 3 parts of sodium sulfate and 15 parts of water to effect "heat setting." A skein of this yarn is submerged in a relaxed condition for $\frac{1}{2}$ hour in water at 90° C., dried, wound around a bobbin, soaked briefly in a solution of one part of pyridine and 20 parts of benzene, and treated for $\frac{1}{8}$ hour in a solution of one part of adipyl chloride and 50 parts of kerosene at 70° C. The product shrinks 3% in water at 100° C. and sticks to a block at 185° C. It has a tenacity of 2.6 g./d. with 12% elongation. The untreated yarn shrinks 70% in water at 100° C., sticks to a block at 105° C., and has a tenacity of 2.2 g./d. with 14% elongation.

(b) Oriented polyvinyl alcohol (50% of carbons in polymer chain attached to hydroxyls) yarn is wound around a bobbin and heated at 70° C. in water for $\frac{1}{30}$ hour. After drying, the bobbin of heat-set polyvinyl alcohol is treated with pyridine and adipyl chloride solution as in part (a) above. Although the product does not dissolve, it shrinks 60% in water at 100° C., and has a tenacity of less than 0.5 g./d. Polyvinyl alcohol yarns therefore do not respond to this treatment as do yarns prepared from hydrolyzed ethylene-vinyl acetate interpolymers.

Example III

A sample of the untreated oriented yarn described in Example II is heat-set while under tension (held at constant length) in aqueous sodium sulfate solution at 102° C. and then submerged in a relaxed condition in water at 90° C. The yarn is wrapped around a bobbin and heated for one hour at 80° C. in a 5% solution of hexamethylene diisocyanate in kerosene. The yarn, after drying, does not stick to a block until the temperature reaches 210° C. and does not shrink in water at 100° C. It has a tenacity of 2.0 g./d. with 12% elongation which is raised to 2.9 g./d. with 12% elongation by heating the yarn under tension in n-butanol at 80° C. for $\frac{1}{2}$ hour. The original untreated yarn, as stated in Example II, shrinks 70% in water at 100° C., sticks to the block at 105 C., and has a tenacity of 2.2 g./d. with 14% elongation.

Example IV

Oriented yarn prepared from hydrolyzed ethylenevinyl acetate interpolymer having a mole ratio of 1.2/1, substantially completely hydrolyzed (23% of the carbon atoms in the polymer chain attached to hydroxyls) is wound around bobbins and treated for 14 hours at 25°–30° C. in the following solutions: (a) 2 parts of N,N′,N″-tris(methoxymethyl)melamine, 2 parts of formaldehyde, and 53 parts of water; and (b) 4 parts of N,N′-bis(methoxymethyl)urea, 10 parts of water and 30 parts of acetone. The treated yarns are rinsed once in water and once in solution of 10 parts of ammonium chloride and 90 parts of water, dried and baked for 2 hours at 130° C. The yarn treated with solution (a) shrinks 2% in water at 100° C. and sticks to a block at 120° C., while yarn treated with solution (b) shrinks 5% in water at 100° C., sticks to a block at 130° C. and has a tenacity of 2.4 g./d. with 20% elongation. (c) Another sample of this same oriented yarn that had been wound around a bobbin is treated for 14 hours in a mixture of 40 parts of water and 2 parts of glyoxal sulfate. The treated yarn is rinsed with water, dried, and baked in air one hour at 125° C. and $\frac{1}{2}$ hour at 135° C. It shrinks 8% in water at 100° C. (d) A further sample of untreated oriented yarn is wound firmly around a bobbin and boiled in toluene for 5 minutes. Sufficient hexamethylene diisocyanate is added to make a solution of 2 parts in 98 parts of the toluene. The solution is boiled one hour and the yarn washed with toluene, and dried. The treated yarn sticks to a block at 250° C., shrinks 25% in water at 100° C., and has a tenacity of 2.7 g./d. with 5% elongation. Oriented, untreated yarn of this composition sticks to a block at 140° C., disintegrates in water at 100° C. and has a tenacity of 3 g./d. with 10% elongation.

Example V

Oriented yarn of the same composition described in Example II is wound around a bobbin and soaked in a solution of N,N′-bis(methoxymethyl)urea in 98 parts of water for 14 hours at 25° C. It is rinsed in distilled water and a solution of 90 parts of water and 10 parts of ammonium chloride, dried at 25° C. and baked one hour at 125° C. and $\frac{1}{2}$ hour at 135° C. The treated yarn shrinks 21% in 6 minutes in water at 100° C. and sticks to a block at 135° C. The yarn is thoroughly washed with distilled water to remove ammonium chloride, retreated with the solution of N,N′-bis(methoxymethyl)urea and washed with water and the ammonium chloride solution. After baking for one hour at 135° C. the yarn shrinks 3% in water at 100° C. and sticks to a hot block at 145° C. The yarn is washed while still on a bobbin with a solution of 1.5 parts of soap and 98.5 parts of water and then with distilled water and dried. A portion of this yarn is heated in water for 10 minutes at 100° C. and dried. It has a tenacity of 1.6 g./d. with 21% elongation. The remainder of the yarn is relaxed in 90 parts of toluene and 10 parts of hexamethylene diisocyanate at 70° C. for one hour. The yarn is washed in toluene, dried and relaxed in air at 110° C. It has a tenacity of 2.2 g./d. with 16% elongation, a loop tenacity of 1.5 g./d. with 16% elongation. It does not shrink in water at 100° C. and does not stick to a block until a temperature of 220° C. has been reached.

Example VI

A skein of unoriented filaments of the same composition described in Example II is soaked 14 hours at 25°–30° C. in a solution of 6 parts of N,N′-bis(methoxymethyl)urea in 94 parts of water. It is rinsed with distilled water and acetone and dried. It is drawn immediately 320% in mineral oil at 90° C., wound on another bobbin under tension, soaked briefly in a solution of 10 parts of ammonium chloride and 90 parts of water, dried and baked in air at 135° C. for one hour. The treated yarn shrinks 6% in water at 100° C. and sticks to a block at 162° C. The N,N′-bis(methoxymethyl)urea does not react with the fibers during drawing, but during the baking at 135° C. in the presence of the ammonium chloride. That is, reaction takes place on the oriented material.

Example VII (a) Oriented yarn prepared from hydrolyzed ethylenevinyl acetate interpolymer, having a mole ratio of 1/2.1, substantially completely hydrolyzed (33.9% of the carbon atoms in the polymer chain attached to hydroxyls) is wound around a bobbin and treated for 16 hours at 0° to 5° C. with a solution of 10 parts of N,N',N''-tris-(methoxymethyl)melamine, 2.5 parts of ammonium chloride, and 87.5 parts of water. After drying at 25°–30° C., the yarn is baked one hour in air at 135° C. It sticks to a block at 155° C., shrinks 8% in water at 100 C., and has a tenacity of 4.0 g./d. with 8% elongation. Untreated yarn sticks to a block at 140° C., disintegrates in water at 100° C., and has a tenacity of 4.7 g./d. with 9% elongation.

(b) Another portion of untreated oriented yarn described under (a) is wound around a bobbin and heated at 102° C. for ½ hour in a solution of 3 parts of sodium sulfate in 15 parts of water and submerged in a relaxed condition for ½ hour at 90° C. in water. A skein of the yarn is soaked 16 hours in a relaxed condition in a solution of 3 parts of N,N',N''-tris(methoxymethyl)melamine, 1 part of ammonium chloride, and 96 parts of water. The dried yarn is wound around a bobbin and after baking for 3 hours at 85° C. and ¼ hour at 135° C., it does not shrink in water at 100° C. and sticks to a block at 145° C. Its tenacity, which is substantially unchanged by heating the yarn in water at 100° C. for 5 minutes, is 4.0 g./d. with 17% elongation. This fiber gives an X-ray diffraction pattern typical of an oriented crystalline polymer in that it contains sharply defined interferences.

(c) Oriented polyvinyl alcohol (50% of the carbons in the polymer chain attached to hydroxyls) yarn that has been heat-set under tension on a bobbin in water at 70° C. for 2 minutes, is treated while still on the bobbin in a solution of N,N',N''-tris(methoxymethyl)melamine and baked substantially as described under (b). Although the product does not dissolve in water at 100° C., its tenacity is less than 0.5 g./d. and it shrinks about 70%. Polyvinyl alcohol yarn does not respond to these treatments as well as yarn from hydrolyzed ethylene-vinyl acetate interpolymers.

*Example VIII*

One skein each of oriented yarn prepared from hydrolyzed ethylene-vinyl acetate interpolymer, having a mole ratio of 1/2.3, 93% hydrolyzed (32% of the carbon atoms in the polymer chain attached to hydroxyls and 2.4% attached to acetyl groups) is treated one hour at 25°–30° C. in the following solutions: (a) 1 part of ammonium chloride, 3.7 parts of formaldehyde, and 95.3 parts of water; (b) 2.5 parts of N,N'-bis-(methoxymethyl)uron, 97.5 parts of water and 0.001 part of 85% phosphoric acid. After drying, both skeins are baked one hour at 130° C. Neither of the skeins shrinks in water at 100° C. nor sticks to a block below 225° C. Untreated yarn disintegrates in water at 100° C. and sticks to a block at 160° C.

*Example IX*

A skein of oriented yarn prepared from hydrolyzed ethylene-vinyl acetate interpolymer, having a mole ratio of 1/3.6, hydrolyzed 95.2% (37.3% of the carbon atoms of the polymer chain attached to hydroxyls and 1.8% attached to acetyl groups) is treated ½ hour in a solution of 1 part of hexamethylene diisocyanate and 640 parts of boiling toluene. Forty parts of mineral oil is added and the temperature gradually raised to 160° C. while the toluene is distilled. The yarn so treated sticks to a block at 195° C. and shrinks 20% in boiling water. Untreated yarn disintegrates in boiling water and sticks to a block at 160° C.

It is understood of course that the above examples are for purposes of illustration only and that the invention is not limited to the materials, reagents, and conditions therein set forth, but is susceptible rather to wide variation as will more clearly be pointed out hereinafter.

In place of the preferred hydrolyzed interpolymers of ethylene with vinyl organicesters, any other hydrolyzed interpolymer of a vinyl organic ester with another polymerizable compound, having less than 45% of the carbon atoms attached to hydroxyl groups, may be treated according to this invention. The interpolymer chain will thus contain —CHOH—CH$_2$— units together with other units the exact character of which is largely irrelevant except, of course, that it is derived from a polymerizable monomer other than a vinyl organic ester and which does not hydrolyze to yield alcoholic hydroxyl groups under the conditions used to hydrolyze the interpolymer. A large number of monomers of this type are known. Particularly well known are vinyl compounds of formula CH$_2$=CHX, where X is a monovalent atom or radical such as halogen, cyano, carboxy, carbalkoxy, acyl, or amide. Another class of polymerizable substances are the vinylidene compounds of formula CH$_2$=CX$_2$, where X is a monovalent atom or radical and where the X's may be the same or different. Examples are vinylidene chloride and methyl methacrylate.

In the case of the preferred hydrolyzed ethylene-vinyl acetate interpolymers, those having an ethylene/vinyl alcohol molar ratio of from 49/1 to 1/3 (hydroxyls on 1 to 38% of the carbon atoms of the polymer chain) give after-treated fibers with good water resistance. The interpolymers with an ethylene/vinyl alcohol ratio of from 3/1 to 1/3 (hydroxyls on 12 to 37.5% of the carbon atoms of the polymer chain) give after-treated fibers of the greatest general utility. For some uses it is possible to obtain sufficient hot water resistance in fibers made from polymers having as much as 45% of the carbon atoms of the polymer chain attached to hydroxyl groups or groups hydrolyzable to hydroxyls.

Part of the hydroxyl groups may be converted into other groups, as acetals or ketals. That is, a hydrolyzed interpolymer may be treated with an aldehyde such as formaldehyde or butyraldehyde under mild conditions to form a formal or butyral with some of the hydroxyl groups. The treatment of the oriented fibers of such materials comes within the scope of this invention. The acetals may be spun, oriented, and then baked as an after-treatment. The aldehyde used in making the acetal serves as the after-treating agent under the conditions of baking.

Heat treatment of the untreated oriented fibers at constant length reduces their shrinkage when placed in water at 100° C. in a relaxed condition. This heat treatment or "setting" at constant length can be effected by heating the fibers in air, water, aqueous salt solutions, or butanol, or in other organic liquids which do not dissolve the fibers. The setting treatment is facilitated by heating the fibers in contact with a small amount of dilute acid such as hydrochloric, sulfuric, phosphoric, or acetic acid. Such acid heat treatment aids in making the fibers less water-sensitive. However, in order to obtain fibers having good resistance to shrinkage in boiling water, particularly in the case of hydrolyzed interpolymers relatively high in hydroxyl content, it is necessary to subject the oriented fibers to the chemical after-treatment of this invention. It is desirable to apply this chemical after-treatment to fibers which have been heat-set since this combines the useful effects of both treatments.

The after-treating agent used in the process of this invention can be applied to the filaments before orientation if the agent does not react immediately. The fiber can then be oriented by drawing, and the agent already present can be caused to react with the oriented fiber by heat, catalyst or aging. If the fibers are treated to raise the melting point before orientation, subsequent orientation is not so successful as when performed first. This emphasizes the importance of carrying out the reaction after orientation.

The fibers can be given more than one treatment with the same after-treating agent or with different agents. In the case of using more than one agent, the treatments can be successive, or a plurality of after-treating agents can be applied at the same time, providing they do not react with each other or the solvent. The application of more than one after-treating agent to the same fiber possesses an advantage in that each may impart valuable properties to the fiber.

The after-treating agents can be applied to fibers containing other modifying substances providing that the modifying substance does not react with all of the after-treating agent. Such modifying substances are dyes, pigments, sizes, weighting, lubricants, plasticizers, and fillers. The fiber may contain substances which can be dissolved out, leaving interstices into which the after-treating agent can penetrate.

If the fiber is first swollen by soaking in an appropriate liquid, the after-treating reagent will react more readily with the fiber.

The procedure which leads to the best fibers, particularly from the standpoint of tensile strength and resistance to shrinking, consists in (1) heat setting the oriented fiber at constant length at 95°–102° C. prior to treatment with the after-treating agent, (2) avoiding the use of excess after-treating agent, and (3) applying all heat or baking treatments to the fiber while it is held at constant length.

The after-treated, oriented fibers of this invention are of general utility, including use for hosiery yarn, weaving, felts, pile fabrics, sewing thread, cordage, nets, screens, fishline, electrical insulation; and monofils as racket and bow strings, fishing leaders, bristles, etc.

I claim:

1. The method of improving oriented fibers of hydrolyzed interpolymers of ethylene with a vinyl organic ester in which from 1% to less than 45% of the carbon atoms of the polymer chain are attached to groups from the class consisting of hydroxyl groups and organic radicals hydrolyzable to hydroxyl groups, which comprises reacting said oriented fibers with a composition comprising essentially polyfunctional substances one mole each of which is reactive with a plurality of moles of diethylamine, said substances being selected from the group consisting of methylol and alkoxymethyl derivatives of uron, melamine, urea and diamides.

2. The method of improving oriented fibers of hydrolyzed interpolymers of ethylene with a vinyl organic ester in which from 1% to less than 45% of the carbon atoms of the polymer chain are attached to groups from the class consisting of hydroxyl groups and organic radicals hydrolyzable to hydroxyl groups, which comprises reacting said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides.

3. The method of improving oriented fibers of hydrolyzed interpolymers of ethylene with a vinyl organic ester in which from 1% to less than 45% of the carbon atoms of the polymer chain are attached to groups from the class consisting of hydroxyl groups and organic radicals hydrolyzable to hydroxyl groups, which comprises treating said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides, then removing the solvent from the treated fibers, and thereafter subjecting said fibers to baking temperatures.

4. The method of improving oriented fibers of hydrolyzed interpolymers of ethylene with a vinyl organic ester wherein from 1% to less than 45% of the carbon atoms of the polymer chain are attached to hydroxyl groups which comprises reacting said oriented fibers with a composition comprising essentially polyfunctional substances one mole each of which is reactive with a plurality of moles of diethylamine, said substances being selected from the group consisting of methylol and alkoxymethyl derivatives of uron, melamine, urea and diamides.

5. The method of improving oriented fibers of hydrolyzed interpolymers of ethylene with a vinyl organic ester wherein from 1% to less than 45% of the carbon atoms of the polymer chain are attached to hydroxyl groups, which comprises reacting said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides.

6. The method of improving oriented fibers of hydrolyzed interpolymers of ethylene with a vinyl organic ester wherein from 1% to less than 45% of the carbon atoms of the polymer chain are attached to hydroxyl groups, which comprises treating said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides, then removing the solvent from the treated fibers, and thereafter subjecting said fibers to baking temperatures.

7. The method of improving oriented fibers of hydrolyzed interpolymers of ethylene with vinyl acetate wherein from 1% to less than 45% of the carbon atoms of the polymer chain are attached to hydroxyl groups, which comprises reacting said oriented fibers with a composition comprising essentially polyfunctional substances one mole each of which is reactive with a plurality of moles of diethylamine, said substances being selected from the group consisting of methylol and alkoxymethyl derivatives of uron, melamine, urea and diamides.

8. The method of improving oriented fibers of hydrolyzed interpolymers of ethylene with vinyl acetate wherein from 1% to less than 45% of the carbon atoms of the polymer chain are attached to hydroxyl groups, which comprises reacting said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides.

9. The method of improving oriented fibers of hydrolyzed interpolymers of ethylene with vinyl acetate wherein from 1% to less than 45% of the carbon atoms of the polymer chain are attached to hydroxyl groups, which comprises treating said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides, then removing the solvent from the treated fibers, and thereafter subjecting said fibers to baking temperatures.

10. The method of improving oriented fibers of hydrolyzed interpolymers of ethylene with vinyl acetate wherein the mole ratio of ethylene to vinyl alcohol varies from 3/1 to 1/3, which comprises reacting said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides.

11. The method of improving oriented fibers of hydrolyzed interpolymers of ethylene with vinyl acetate wherein the mole ratio of ethylene to vinyl alcohol varies from 3/1 to 1/3, which comprises treating said oriented fibers in one or more stages with a solution of a polyfunctional substance or substances one mole each of which will react with a plurality of moles of diethylamine, said substance being selected from the group consisting of methylol and alkoxymethyl derivatives of uron, melamine, urea and diamides, then removing the solvent from the treated fibers, and thereafter subjecting said fibers to baking temperatures.

12. Oriented fibers of hydrolyzed interpolymers of ethylene with a vinyl organic ester which have been reacted subsequent to orientation with polyfunctional substances one mole each of which is reactive with a plurality of moles of diethylamine, said substances being selected from the group consisting of methylol and alkoxymethyl derivatives of uron, melamine, urea and diamides, said interpolymer before reaction having from 1% to less than 45% of the carbon atoms of the polymer chain attached to groups from the class consisting of hydroxyl groups and organic radicals hydrolyzable to hydroxyl groups, said reacted fibers being further characterized by being substantially insoluble in water at 100° C., and having a lower degree of retraction in water than the unreacted fiber.

13. Oriented fibers of hydrolyzed interpolymers of ethylene with a vinyl organic ester, which fibers have been reacted subsequent to orientation with polyfunctional substances one mole each of which is reactive with a plurality of moles of diethylamine, said substances being selected from the group consisting of methylol and alkoxymethyl derivatives of uron, melamine, urea and diamides, said hydrolyzed interpolymer before reaction having from 1% to less than 45% of the carbon atoms of the polymer chain attached to hydroxyl groups, said reacted fibers being further characterized by being substantially insoluble in water at 100° C., and having a lower degree of retraction in water than the unreacted fiber.

14. Oriented fibers of hydrolyzed interpolymers of ethylene with vinyl acetate, which fibers have been reacted subsequent to orientation with polyfunctional substances one mole each of which is reactive with a plurality of moles of diethylamine, said substances being selected from the group consisting of methylol and alkoxymethyl derivatives of uron, melamine, urea and diamides, said hydrolyzed interpolymer before reaction having from 1% to less than 45% of the carbon atoms of the polymer chain attached to hydroxyl groups, said reacted fibers being further characterized by being substantially insoluble in water at 100° C., and having a higher melting point and a lower degree of retraction in water than the unreacted fiber.

15. Oriented fibers of hydrolyzed interpolymers of ethylene with vinyl acetate which fibers have been reacted subsequent to orientation with polyfunctional substances one mole each of which is reactive with a plurality of moles of diethylamine, said substances being selected from the group consisting of methylol and alkoxymethyl derivatives of uron, melamine, urea and diamides, said hydrolyzed interpolymer before reaction having from 1 to 38% of the carbon atoms of the polymer chain attached to hydroxyl groups, said reacted fibers being further characterized by being substantially insoluble in water at 100° C., and having a higher melting point and a lower degree of retraction in water than the unreacted fiber.

16. An oriented fiber of a substantially completely hydrolyzed interpolymer of ethylene with vinyl acetate, which fiber has been reacted subsequent to orientation with N,N'-bis(methoxymethyl)urea, said hydrolyzed interpolymer before reaction having from 12 to 37.5% of the carbon atoms of the interpolymer chain attached to hydroxyl groups, said reacted fiber being further characterized by substantial insolubility in water at 100° C. and a higher melting point and a lower degree of retraction in water than the unreacted fiber.

17. The method of improving an oriented fiber of a substantially completely hydrolyzed interpolymer of ethylene with vinyl acetate wherein from 12 to 37.5% of the carbon atoms of the interpolymer chain are attached to hydroxyl groups, which comprises treating said oriented fiber with a solution of N,N'-bis(methoxymethyl)urea, removing the solvent from the treated fiber, and thereafter subjecting said fiber to a baking temperature.

ALBERT FARIS SMITH.